(12) United States Patent
Shibata

(10) Patent No.: US 8,227,130 B2
(45) Date of Patent: Jul. 24, 2012

(54) FUEL CELL

(75) Inventor: Kazunori Shibata, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 766 days.

(21) Appl. No.: 12/376,842

(22) PCT Filed: Aug. 8, 2007

(86) PCT No.: PCT/IB2007/002286
§ 371 (c)(1),
(2), (4) Date: Feb. 9, 2009

(87) PCT Pub. No.: WO2008/017935
PCT Pub. Date: Feb. 14, 2008

(65) Prior Publication Data
US 2010/0003560 A1    Jan. 7, 2010

(30) Foreign Application Priority Data
Aug. 10, 2006  (JP) ................................. 2006-218783

(51) Int. Cl.
*H01M 8/02*  (2006.01)
*H01M 8/04*  (2006.01)
(52) U.S. Cl. .................. 429/456; 429/432; 429/513
(58) Field of Classification Search .................. 429/432, 429/456, 513
See application file for complete search history.

(56) References Cited

U.S. PATENT DOCUMENTS

| | | | |
|---|---|---|---|
| 5,432,023 | A | 7/1995 | Yamada et al. |
| 6,605,381 | B1 | 8/2003 | Rosenmayer |
| 7,867,660 | B2 * | 1/2011 | Mitsuta ..................... 429/456 X |
| 2004/0086775 | A1 | 5/2004 | Lloyd et al. |
| 2005/0227137 | A1 | 10/2005 | Suga |
| 2006/0093880 | A1 | 5/2006 | Igarashi et al. |

FOREIGN PATENT DOCUMENTS

| | | |
|---|---|---|
| CN | 1367941 A | 9/2002 |
| EP | 1 231 656 A1 | 8/2002 |
| GB | 2 422 716 A | 8/2006 |
| JP | 06-168728 A | 6/1994 |
| JP | 06-349508 A | 12/1994 |
| JP | 2002-170581 A | 6/2002 |
| WO | 2006/077463 A1 | 12/1899 |
| WO | 00/14816 A2 | 3/2000 |
| WO | 2005/031905 A1 | 4/2005 |

OTHER PUBLICATIONS

Chinese Office Action issued for Chinese Patent Application No. CN 200780029701.6 on Jul. 7, 2010.

* cited by examiner

*Primary Examiner* — Stephen J. Kalafut
(74) *Attorney, Agent, or Firm* — Sughrue Mion, PLLC

(57) ABSTRACT

A fuel cell (100) has an electrical generation section (24) including an anode, an electrolyte, and a cathode; a porous-body flow passage (50, 60) disposed on at least one side of the anode side of the electrical generation section and the cathode side thereof; and a separator (10) disposed on the opposite side of the porous-body flow passage from the electrical generation section; wherein the porous-body flow passage includes a high porosity location (51, 61) having a higher porosity than an average porosity thereof and a low porosity location having a lower porosity than the average porosity thereof, wherein the high porosity location communicates with a gas discharging-side manifold (41b, 42b) via the low porosity location.

10 Claims, 6 Drawing Sheets

FUEL CELL

BACKGROUND OF THE INVENTION

1. Field of the Invention

The present invention relates to a fuel cell.

2. Description of the Related Art

A fuel cell is a device that obtains electrical energy generally by using hydrogen and oxygen as a fuel. Because fuel cells are superior in terms of the environment and increased energy efficiency, development of fuel cells is being pursued as a future energy-supplying system.

For example, the Japanese Patent Application Publication No. 6-349508 describes art in which porous body electrically conductive current collector electrodes are disposed on both surfaces of a membrane-electrode assembly (MEA) to function as a gas flow passage and a current collector. According to this art, it is possible to distribute current to the membrane-electrode assembly.

With the art described in the Japanese Patent Application Publication No. 6-349508, however, when a part within the porous electrically conductive electrical collector electrode is blocked by liquid water, there is a possibility that reactant gas is not supplied to the electrode, which could lead to a decrease in electrical generating capacity.

SUMMARY OF THE INVENTION

The present invention provides a fuel cell that suppresses a decrease in electrical generating performance.

A first aspect of the present invention relates to a fuel cell. The fuel cell has an electrical generation section that includes an anode, an electrolyte, and a cathode; a porous-body flow passage disposed on at least one side of the anode side of the electrical generation section and the cathode side thereof; and a separator disposed on the opposite side of the porous-body flow passage from the electrical generation section. The porous-body flow passage includes a high porosity region having a higher porosity than an average porosity thereof and a low porosity region having a lower porosity than the average porosity thereof. The high porosity region communicates with a gas discharge-side manifold via the low porosity region.

In the fuel cell according to the first aspect of the present invention, a reactant gas flows easily through the high porosity region, because the high porosity region has small resistance impeding the flow of reactant gas. The reactant gas therefore diffuses easily through the entire porous-body flow passage via the high porosity region. It is possible to discharge water that is produced at the time of electrical generation (water produced by electrical generation) via the high porosity region. It is thus possible to suppress water produced by electrical generation from accumulating. As a result, a decrease in electrical generating efficiency can be suppressed.

The high porosity region may extend from a gas supply side to a gas exhaust side. In this case, the water produced by electrical generation generally tends to accumulate on the downstream side. The reactant gas is thus difficult to diffuse on the downstream side. According to the fuel cell of the first aspect of the present invention, however, even if the water produced by electrical generation accumulates on the downstream side of the porous-body flow passage, the diffusion of gas to the downstream side of the porous-body flow passage is promoted. Therefore, a decrease in electrical generating efficiency may be suppressed more efficiently.

The high porosity region may be connected to a gas supplying-side manifold. In this case, the reactant gas easily diffuses via the high porosity region. The porous-body flow passage may have a plurality of high porosity regions. In this case, the gas diffusion is promoted. The lengths of each high porosity region may be different. In this case, the reactant gas can be easily supplied through the entire electrical generation section.

The fuel cell may further have a flow control member that controls a flow of discharge gas from the anode, in which the porous-body flow passage may be disposed at least at the anode side of the electrical generation section. The flow control member may stop the flow of discharge gas from the anode. In this case, controlling the flow of the anode off-gas improves the consumption efficiency of hydrogen. Even though the flow of anode off-gas stops, the diffusion of fuel gas in the porous-body flow passage is promoted, thereby increasing the time that the electrical generation section generates electricity when the flow of anode off-gas stops. The consumption efficiency of hydrogen can therefore be promoted.

The flow control member may be a valve capable of control to stop the gas flow. The fuel cell may further have a voltage-detecting unit that detects a voltage of the fuel cell in which the valve may be switched based on a voltage detected by the voltage-detecting unit.

The fuel cell may further have a pressure loss adjusting section that adjusts the pressure loss of anode discharge gas to make it larger than that of gas supplied to the anode, in which the porous-body flow passage may be disposed at least on the anode side of the electrical generation section. In this case, even though the anode off-gas flow is suppressed, the diffusion of fuel gas in the porous-body flow passage can be promoted, thereby lengthening the time that the electrical generation section can generate electricity when the flow of anode off-gas is suppressed. The consumption efficiency of hydrogen is thereby enhanced. Additionally, the high porosity region may be a void. In this case, the high porosity region is easily formed. The high porosity region may be a cut-out or a groove that is formed on the separator side of the porous-body flow passage. The separator may have a plate-like shape.

According to the present invention, a decrease in electrical generating performance of the fuel cell can be suppressed.

BRIEF DESCRIPTION OF THE DRAWINGS

The foregoing and further features and advantages of the invention will become apparent form the following description of example embodiments with reference to the accompanying drawings, wherein like numerals are used to represent like elements, and wherein.

DETAILED DESCRIPTION OF THE EMBODIMENTS

The best mode of practicing the present invention described below.

Figure 1:
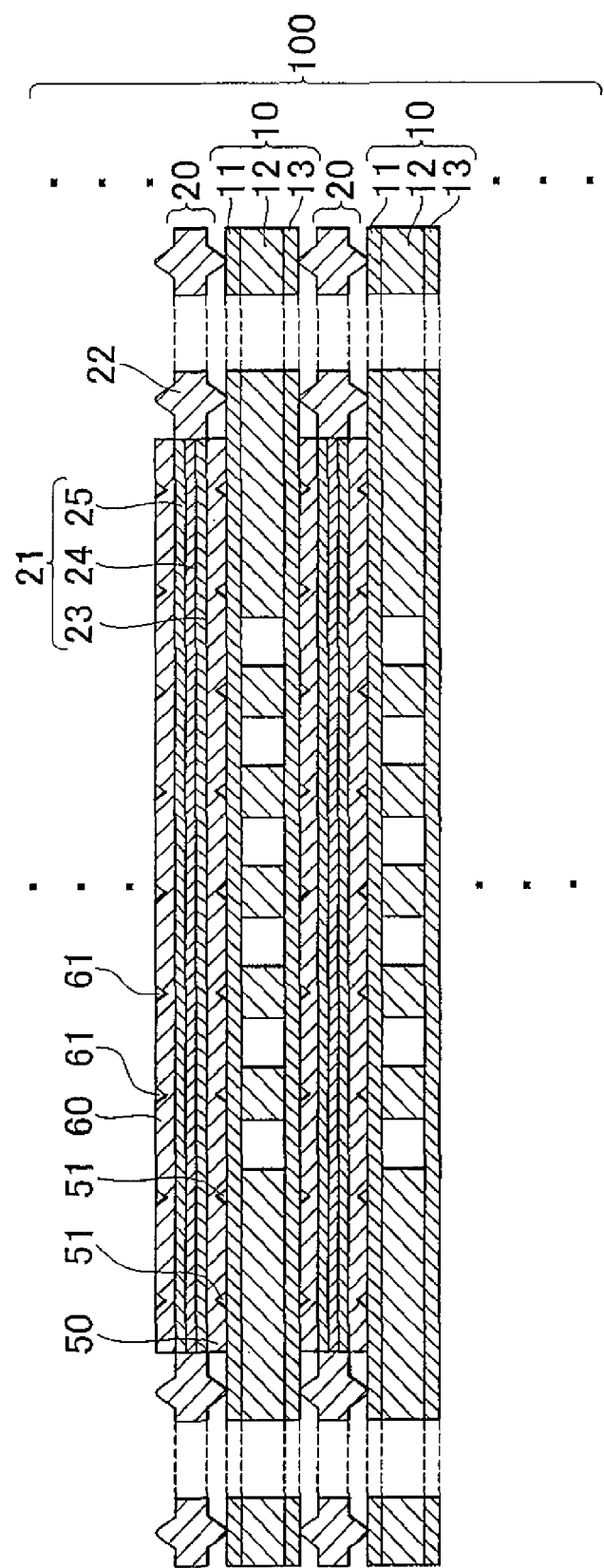
FIG. 1 is a simplified drawing of a fuel cell according to a first embodiment of the present invention.

FIG. 1 is a simplified drawing showing a fuel cell 100 according to the first embodiment of the present invention. As shown in FIG. 1, the fuel cell 100 is configured by a plurality of membrane-electrode assemblies with sealing gaskets (hereinafter MEA-gasket assemblies) 20 having a porous-body flow passage 50 disposed on one surface and a porous-body flow passage 60 disposed on another surface, the plurality of MEA-gasket assemblies being laminated with separators 10 therebetween. The separator 10 has a plate-like shape, in which a center plate 12 is sandwiched between a cathode-opposing plate 11 and an anode-opposing plate 13. The three plates making up the separator 10 may be joined by, for example, hot-pressing.

The porous-body flow passages 50, 60 are made of a porous, electrically conductive material. It is possible to use, for example, a foam-sintered metal, such as porous stainless steel, as the porous-body flow passages 50, 60. The average porosity of the porous-body flow passages 50, 60 is, for example, approximately 70% to 85%, the average pore diameter therein is, for example, approximately 50 μm to 150 μm, and the thickness thereof is approximately 0.6 mm. The porous-body flow passage 50 functions as a flow passage for oxidizing gas, and the porous-body flow passage 60 functions as a flow passage for fuel gas. The porous-body flow passages 50, 60 also serve as current collectors. The porous-body flow passage 50 has a plurality of cut-outs 51 formed therein, and the porous-body flow passage 60 has a plurality of cut-outs 61 formed therein. Details of the cut-outs 51, 61 are described later.

The MEA-gasket assembly 20 has a membrane-electrode assembly (MEA) 21 and a sealing gasket 22. The MEA 21 has an electrical generation section 24, in which a catalyst layer is formed on both surfaces of an electrolyte membrane that has proton conductivity, a gas-diffusing layer 23 formed on one surface of the electrical generation section 24, and a gas-diffusing layer 25 formed on the other surface of the electrical generation section 24.

The gas-diffusing layers 23, 25 may be made from a porous, electrically conductive material, such as carbon paper. The gas-diffusing layer 23 diffuses oxidizing gas flowing in the porous-body flow passage 50 into the electrical generation section 24. The gas-diffusing layer 25 diffuses fuel gas flowing in the porous-body flow passage 60 into the electrical generation section 24. Thus, the gas-diffusing layers 23, 25 have a different from that of the porous-body flow passages 50, 60. In this embodiment, one side surface of the MEA 21 functions as a cathode, and the other side surface of the MEA 21 functions as an anode.

Figure 2A:
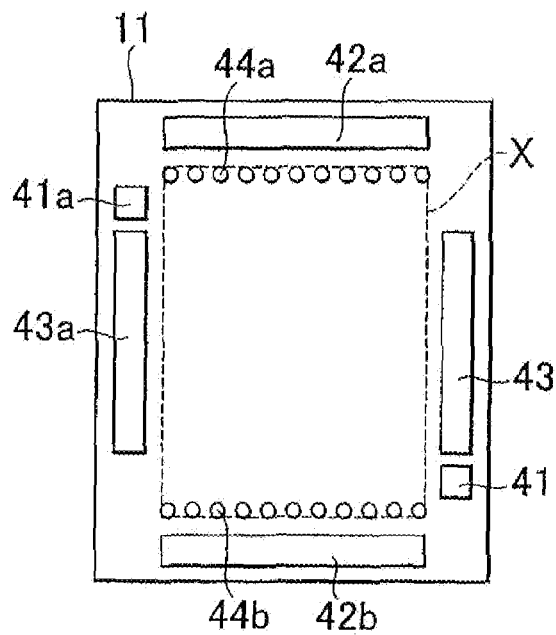
FIG. 2A to FIG. 2D are drawings describing the details of an separator and an MEA with a separator and sealing gasket.
Figure 2B:
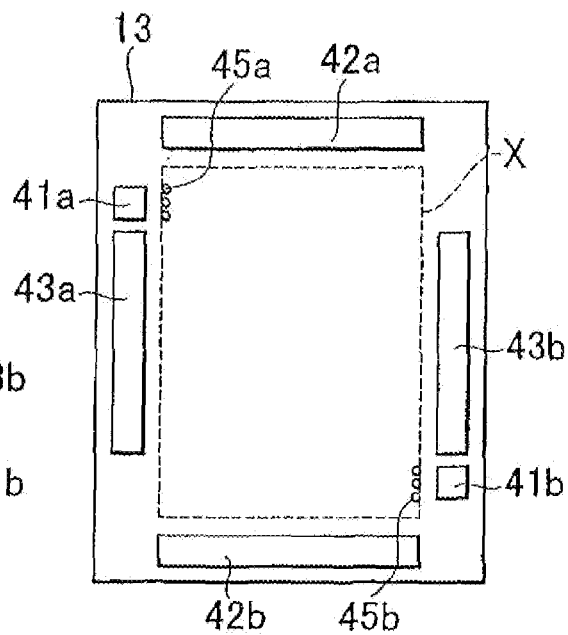
Figure 2C:
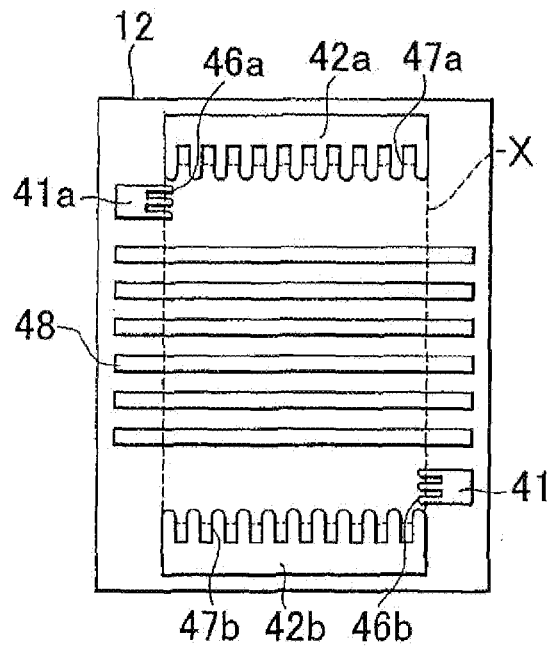
Figure 2D:
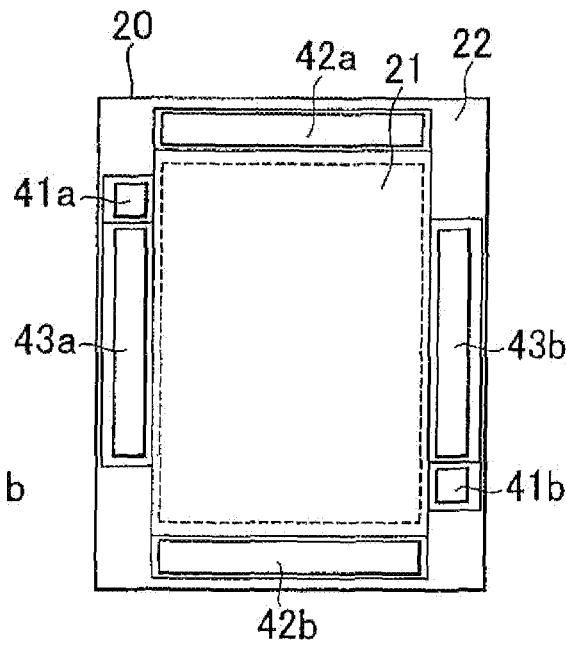

FIG. 2A to FIG. 2D are provided to describe the details of the separator 10 and the MEA-gasket assembly 20. FIG. 2A is a schematic plan view of the cathode-opposing plate 11, FIG. 2B is a schematic plan view of the anode-opposing plate 13, FIG. 2C is a schematic plan view of the center plate 12, and FIG. 2D is a schematic plan view of the MEA-gasket assembly 20.

The cathode-opposing plate 11 is a rectangular metal plate. A plate made of, for example, titanium, a titanium alloy, or stainless steel, the surface of which has been plated to prevent corrosion, may be used as the metal plate. The cathode-opposing plate 11 may have a thickness of, for example, approximately 0.15 mm.

As shown in FIG. 2A, the part of the cathode-opposing plate 11 that opposes the MEA 21 (hereinafter referred to as the electrical generation region X) is flat. A fuel gas supplying manifold 41a, a fuel gas discharging manifold 41b, an oxidizing gas supplying manifold 42a, an oxidizing gas discharging manifold 42b, a coolant supplying manifold 43a, and a coolant discharging manifold 43b are provided on the outer periphery of the cathode-opposing plate 11. In addition, a plurality of oxidizing gas supply holes 44a and a plurality of oxidizing gas discharge holes 44b are formed on the cathode-opposing plate 11. The foregoing manifolds and holes pass through the cathode-opposing plate 11 in the thickness direction thereof.

The anode-opposing plate 13 is a rectangular metal plate having substantially the same shape as the cathode-opposing plate 11 and is made of a material similar to the cathode-opposing plate 11. The anode-opposing plate 13 may have a thickness of, for example, 0.15 mm. As shown in FIG. 2B, the electrical generation region X of the anode-opposing plate 13 is flat.

Similar to the cathode-opposing plate 11, a fuel gas supplying manifold 41a, a fuel gas discharging manifold 41b, an oxidizing gas supplying manifold 42a, an oxidizing gas discharging manifold 42b, a coolant supplying manifold 43a, and a coolant discharging manifold 43b are formed on the outer periphery of the anode-opposing plate 13. Likewise, a plurality of fuel gas supply holes 45a and a plurality of fuel gas discharge holes 45b are formed on the anode-opposing plate 13. The foregoing manifolds and holes pass through the anode-opposing plate 13 in the thickness direction thereof.

The center plate 12 is a rectangular metal plate having the same shape as the cathode-opposing plate 11, and is made of a material similar to the cathode-opposing plate 11. The center plate 12 may have a thickness of, for example, 0.35 mm.

Similar to the cathode-opposing plate 11, a fuel gas supplying manifold 41a, a fuel gas discharging manifold 41b, an oxidizing gas supplying manifold 42a, and an oxidizing gas discharging manifold 42b are formed on the outer periphery of the center plate 12. The center plate 12 has a plurality of fuel gas supply flow passages 46a, one end of which communicates with the fuel gas supplying manifold 41a, and the other end of which communicates with the fuel gas supplying manifold 45a. In the same manner, the center plate 12 has a plurality of fuel gas discharge flow passages 46b, one end of which communicates with the fuel gas discharging manifold 41b and the other end of which communicates with the fuel gas discharging manifold 45b.

Additionally, a plurality of oxidizing gas supply flow passages 47a, one end of which communicates with the oxidizing gas supply manifold 42a and the other end which communicates with the oxidizing gas supplying holes 44a are formed in the center plate 12. In the same manner, a plurality of oxidizing gas discharge flow passages 47b, one end of which communicates with the oxidizing gas discharging manifold 42b and the other end of which communicates with the oxidizing gas discharge holes 44b are formed in the center plate 12. In addition, a plurality of coolant flow passages 48, one end of which communicates with the coolant supplying manifold 43a and the other end of which communicates with the coolant discharging manifold 43b are also formed in the center plate 12. The foregoing flow passages pass through the center plate 12 in the thickness direction thereof.

As shown in FIG. 2D, the structure of the MEA-gasket assembly 20 has a sealing gasket 22 on the outer peripheral edge of the MEA 21. The sealing gasket 22 is made of a resin material such as silicone rubber, butyl rubber, or fluorine-based rubber. The sealing gasket 22 is manufactured by injection molding, with the outer periphery of the MEA 21 facing the cavity of the mold to injection mold the above-noted resin material. By using this method, the MEA 21 and sealing gasket 22 are joined without a gap therebetween. By doing this, it is possible to prevent the leakage of coolant, oxidizing gas, and fuel gas from the joint.

Similar to the cathode-opposing plate 11, a fuel gas supplying manifold 41a, a fuel gas discharging manifold 41b, an oxidizing gas supplying manifold 42a, an oxidizing gas discharging manifold 42b, a coolant supplying manifold 43a, and a coolant discharging manifold 43b are formed in the sealing gasket 22. The sealing gasket 22 provides a seal between two separators, which make contact with the upper surface and the lower surface thereof. The sealing gasket 22 provides a seal between the outer periphery of the MEA 21 and the outer periphery of the manifolds.

The general operation of the fuel cell 100 will now be described. First, fuel gas that contains hydrogen is supplied to the fuel gas supplying manifold 41a. The fuel gas is supplied via the fuel gas supplying manifold 46a to the porous-body flow passage 60. Fuel gas supplied to the porous-body flow passage 60 passes through the porous-body flow passage 60 as it is supplied to the gas-diffusing layer 25 on the anode side of the MEA 21. The fuel gas supplied to the gas-diffusing layer 25 diffuses through the gas-diffusing layer 25 and reaches the catalyst layer on the anode side of the electrical generation section 24. The hydrogen contained in the fuel gas is converted to protons at the catalyst layer of the electrical generation section 24. The converted protons are conducted through the electrolyte membrane of the electrical generation section 24 and reach the catalyst layer on the cathode side.

Oxidizing gas that contains oxygen is supplied to the oxidizing gas supplying manifold 42a. The oxidizing gas is supplied via oxidizing gas supplying passage 47a to the porous-body flow passage 50. The oxidizing gas supplied to the porous-body flow passage 50 flows through the porous-body flow passage 50 as it is supplied to the gas-diffusing layer 23 on the cathode side of the MEA 21. The oxidizing gas supplied to the gas-diffusing layer 23 diffuses through the gas-diffusing layer 23 and reaches the catalyst layer on the cathode side of the electrical generation section 24. After that, water is produced and electricity is generated from the oxygen in the oxidizing gas and the protons that reached the catalyst layer on the cathode side. The generated electrical energy is recovered via the porous-body flow passages 50, 60 and the separators 10.

Cooling water, for example, may be supplied to the coolant supplying manifold 43a. The coolant flows through the coolant flow passage 48 and cools the fuel cell 100. By doing this, it is possible to adjust the temperature of the fuel cell 100 to an appropriate temperature. After flowing through the coolant flowing passage 48, coolant is discharged to the outside via the coolant discharging manifold 43b. Fuel gas not used in electrical generation is discharged to the outside via the fuel gas discharge flow passage 46b and the fuel gas discharging manifold 41b. Also, oxidizing gas not used in electrical generation is discharged to the outside via the oxidizing gas discharge flow passage 47b and the oxidizing gas discharging manifold 42b.

Figure 3A:
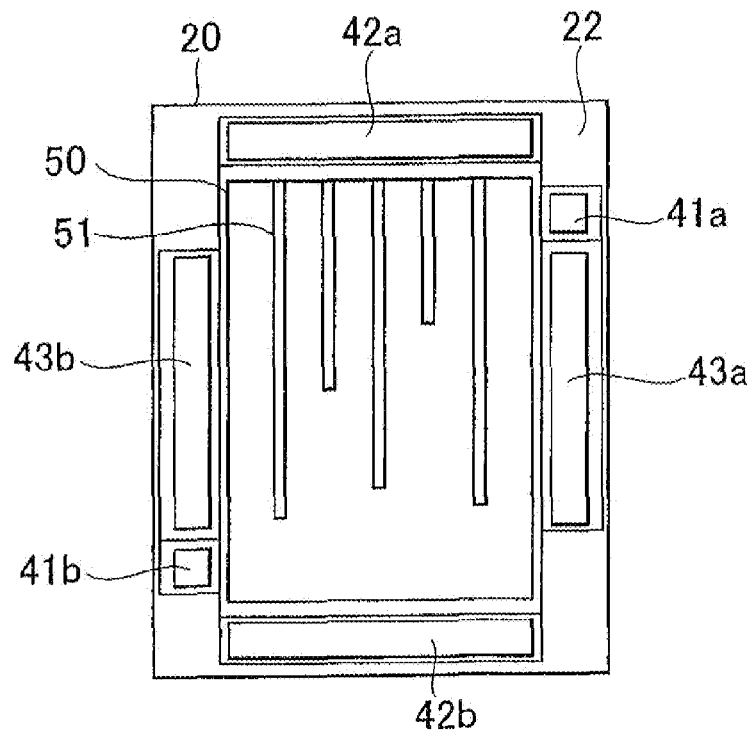
FIG. 3A and FIG. 3B are drawings describing the details of the porous-body flow passages.
Figure 3B:
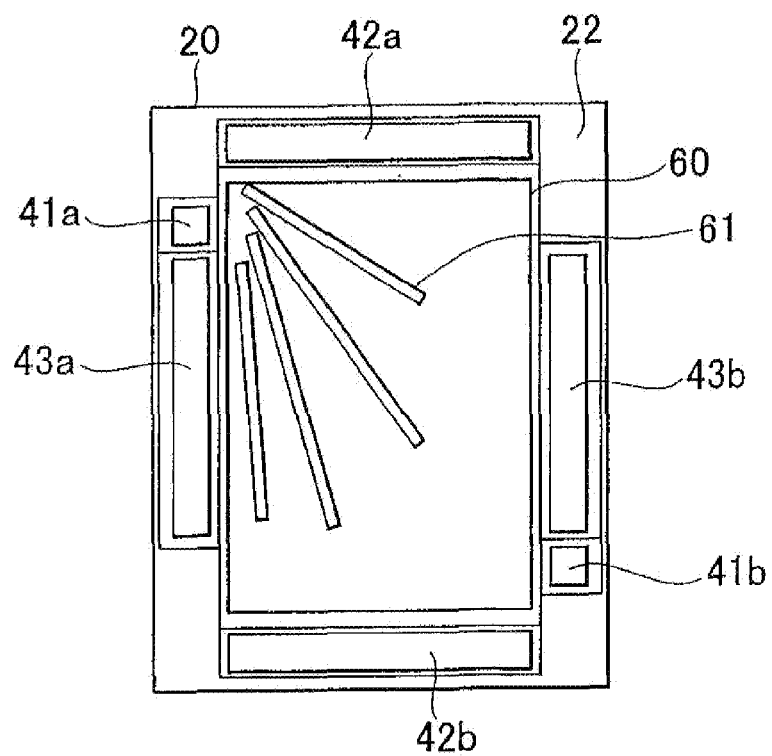

The details of the porous-body flow passages 50, 60 will now be described. FIG. 3A and FIG. 3B describe the details of the porous-body flow passage 50, 60. FIG. 3A shows the boundary of the porous-body flow passage 50 with the separator 10, and FIG. 3B shows the boundary of the porous-body flow passage 60 with the separator 10. As shown in FIG. 3A and FIG. 3B, the porous-body flow passages 50, 60 have substantially the same shape as the electrical generation section 24. The porous-body flow passages 50, 60 have dimensions of, for example, 85 mm×278 mm.

As shown in FIG. 3A, a plurality of cut-outs 51 are formed on the separator 10 side of the porous-body flow passage 50. The cut-outs 51 extend in the direction from the oxidizing gas supply holes 44a to the oxidizing gas discharge holes 44b.

The cut-outs 51 are formed with a mutual spacing therebetween of, for example, approximately several millimeters to several centimeters. The width of the cut-outs 51 may be, for example, approximately 1 mm to 4 mm. Although the cut-outs 51 may be directly connected to the oxidizing gas supplying manifold 42a via the oxidizing gas supply holes 44a, they are connected to the oxidizing gas discharge holes 44b via the porous conductor forming the porous-body flow passage 50.

Because there is little resistance to the flow of gas at the cut-outs 51, it is easy for oxidizing gas to flow through the cut-outs 51. The oxidizing gas, therefore, diffuses throughout the entire porous-body flow passage 50 via the cut-outs 51. The water produced by electrical generation in general tends to accumulate downstream, making diffusion of gas difficult downstream. However, with the above-described configuration, even if water produced by electrical generation accumulates downstream from the porous-body flow passage 50, diffusion of gas in the downstream direction from the porous-body flow passage 50 is promoted.

In this case, it is possible to make the electrical generation distribution in the MEA 21 uniform, and to improve transient response. That is, when there is a variation in the amount of oxidizing gas supplied, the amount of time for the amount of electricity generated in the MEA 21 to reach an amount of electricity matching the amount of oxidizing gas supplied is reduced. This is because supply of oxidizing gas to the entire MEA 21 is facilitated. The drainage of water is also improved. That is, it becomes easy to discharge water generated at the time of electrical generation via the cut-outs 51. By doing this, it is possible to suppress accumulation of water produced by electrical generation.

As shown in FIG. 3B, a plurality of cut-outs 61 are formed on the separator 10 side of the porous-body flow passage 60. The cut-outs 61 extend in the direction from the fuel gas supply holes 45a to the fuel gas discharge holes 45b. The width of the cut-outs 61 may be, for example, approximately 1 mm to 4 mm. Although the cut-outs 61 may be connected directly to the fuel gas supplying manifold 41a via the fuel gas supply holes 45a, they are connected to the fuel gas discharge holes 45b via the porous conductor that forms the porous-body flow passage 60.

By adopting the above-described configuration, the fuel gas diffuses throughout the entire porous-body flow passage 60 via the cut-outs 61. By doing this, the diffusion of the fuel gas is improved. In this case, it is possible to make the electrical generation distribution of the MEA 21 uniform, and to improve the transient response. That is, when there is variation in the amount of fuel gas supplied, the amount of time for the amount of electricity generated in the MEA 21 to reach an amount of electricity matching the amount of fuel gas supplied is shortened. Additionally, drainage of water is improved when water produced in electrical generation diffuses in reverse to the anode side.

The lengths of the cut-outs 51 may vary between each cut out 51. Having cut-outs 51 of different lengths facilitates the diffusion of fuel gas throughout the entire porous-body flow passage 50. In the same manner, by varying the lengths of each cut-out 61 facilitates the diffusion of the fuel gas throughout the entire porous-body flow passage 60.

Figure 4A:
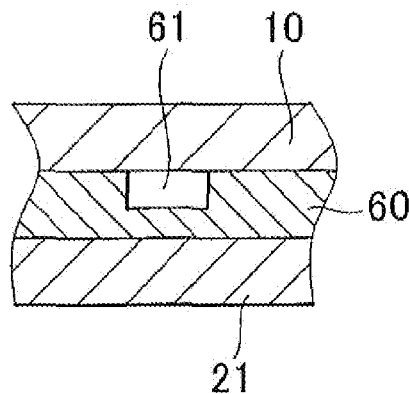
FIG. 4A to FIG. 4F are drawings showing examples cut-out shapes.
Figure 4B:
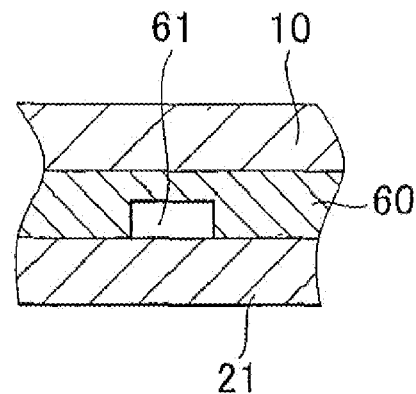

FIG. 4A to FIG. 4F show examples of the shapes of the cut-outs 61. The configuration described below may also be applied to the cut-outs 51. As shown in FIG. 4A and FIG. 4B, the cut-outs 61 may have rectangular cross-sections. As shown in FIG. 4A, the cut-outs 61 may be channel-shaped and formed between the separator 10 and the porous-body flow passage 60. As shown in FIG. 4B, the cut-outs 61 may be channel-shaped and formed between the MEA 21 and the porous-body flow passage 60.

Figure 4C:
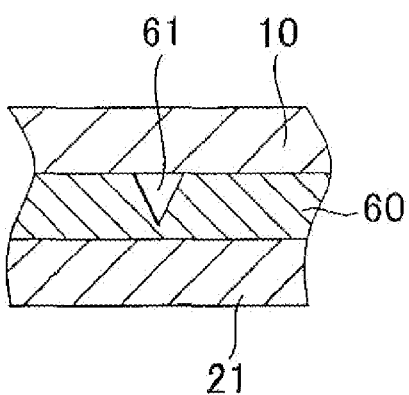
Figure 4D:
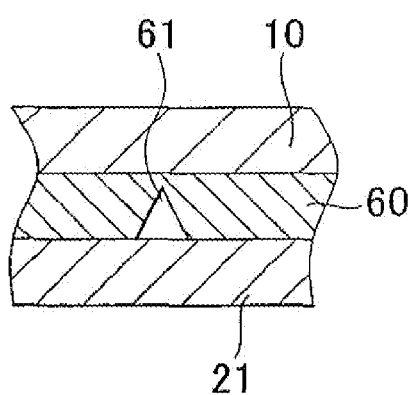

As shown in FIG. 4C and FIG. 4D, the cut-outs 61 may have a triangular cross-section. If the cut-outs 61 are formed between the separator 10 and the porous-body flow passage 60, it is preferable that the triangles open toward the separator 10. If the cut-outs 61 are formed between the MEA 21 and the porous-body flow passage 60, it is preferable that the triangles-open toward the MEA 21. This is to facilitate formation of the cut-outs 61 in the porous-body flow passage 60.

Figure 4E:
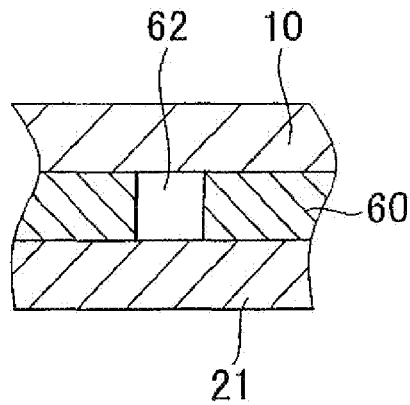
Figure 4F:
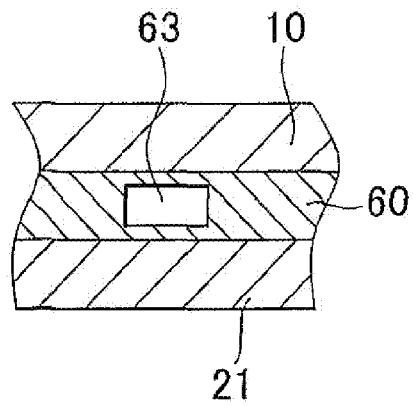

As shown in FIG. 4E, grooves 62 that divide the porous-body flow passage 60 in the gas flow direction may be provided in place of the cut-outs 61. Additionally, as shown in FIG. 4F, through-holes 63 passing through the porous-body flow passage 60 in the gas flow direction may be provided in place of the cut-outs 61. Although the grooves 62 and the through-holes 63 may directly communicate with the fuel gas supply holes 45a, they communicate with the fuel gas discharge holes 45b via the porous conductor that forms the porous-body flow passage 60.

Figure 5:
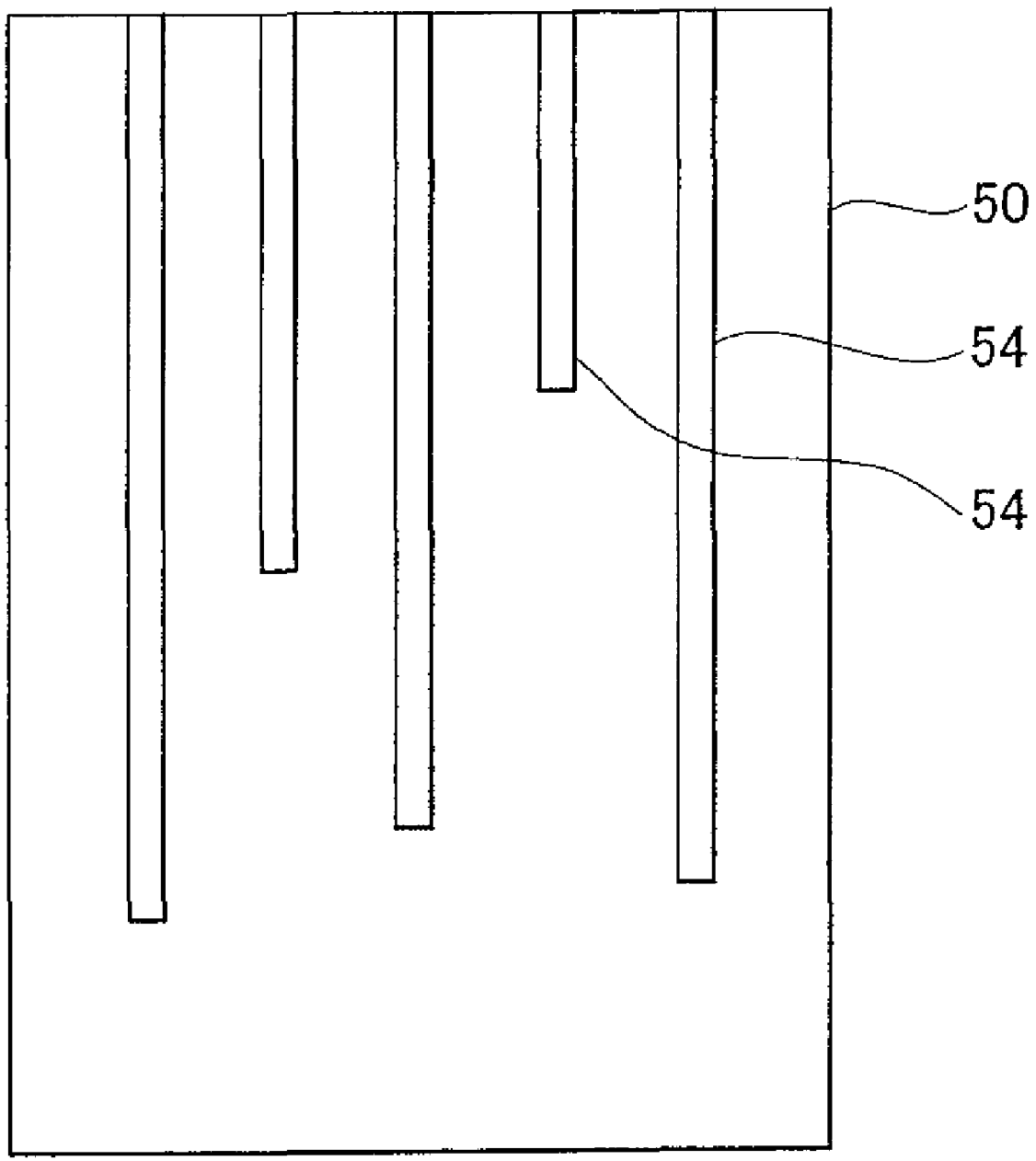
FIG. 5 is a drawing showing another example of a porous-body flow passage.

As shown in FIG. 5, low porosity portion 54 having an porosity lower than the average porosity of the porous-body flow passage 50 may be provided in place of the voids such as the cut-outs 51. In this case as well, in addition to promoting the diffusion of gas via the low porosity portion 54, it is possible to improve the drainage of water produced by electrical generation. In the porous-body flow passage 60 as well, low porosity portion having porosity lower than the average porosity of the porous-body flow passage 60 may be provided in place of the cut-outs 61.

As long as the one of the above-described cut-outs, grooves, or through-holes is provided in either of the porous-body flow passages 50, 60 the effect of the present invention may be achieved. The effect of the present invention may be achieved in any fuel cell in which the accumulation of water produced by electrical generation hinders the diffusion of gas in a porous-body flow passage. The above-noted cut-outs, grooves, and through-holes may be formed by, for example, polishing or etching.

In this embodiment, the electrically conductive material that forms the porous-body flow passages 50, 60 is an embodiment of the low porosity region, the cut-outs 51, 61, the grooves 62, and the through-holes 63 are embodiments of the high porosity regions, the fuel gas discharging manifold 41b or oxidizing gas discharging manifold 42b are embodiments of the gas discharging-side manifold, and the fuel gas supplying manifold 41a or the oxidizing gas supplying manifold 42a are embodiments of the gas supplying-side manifold.

Figure 6:
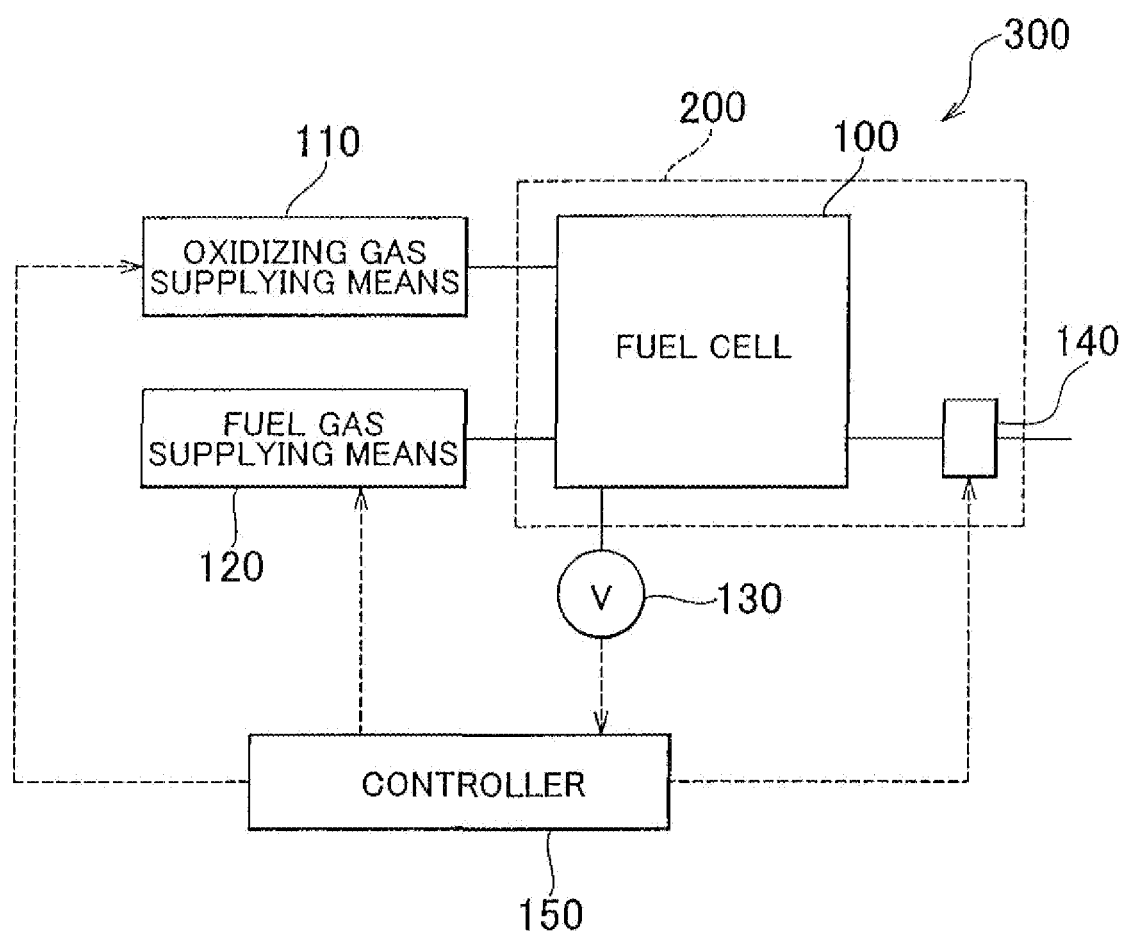
FIG. 6 is a schematic view showing the overall configuration of a fuel cell system provided with the fuel cell according to a second embodiment of the present invention.

A fuel cell 200 according to the second embodiment of the present invention will now be described. FIG. 6 is a schematic view showing the overall configuration of a fuel cell system 300 provided with the fuel cell 200. As shown in FIG. 6, the fuel cell system 300 has a fuel cell 200, an oxidizing gas supplying means 110, a fuel gas supplying means 120, a voltage-detecting means 130, and a controller 150. The fuel cell 200 has a construction that is the fuel cell 100 of the first embodiment with the addition of a valve 140.

The oxidizing gas supplying means 110 is an apparatus for supplying gas containing oxygen to the oxidizing gas supplying manifold 42a of the fuel cell 200. An air pump, for example, may be used as the oxidizing gas supplying means 110. The fuel gas supplying means 120 is an apparatus for supplying fuel gas containing hydrogen to the fuel gas supplying manifold 41a of the fuel cell 200. A liquid hydrogen tank or reformer, for example, may be used as the fuel gas supplying means 120.

The voltage-detecting means 130 may be a voltmeter or the like that detects the generated voltage of the fuel cell 200. The valve 140 controls the flow of the fuel gas discharged from the fuel cell 200, and is connected to the fuel gas discharging manifold 41b of the fuel cell 200. The controller 150 includes a CPU (central processing unit), a ROM (read-only memory), and a RAM (random-access memory).

The operation of the fuel cell system 300 will now be described. The oxidizing gas supplying means 110, in accordance with an instruction from the controller 150, supplies a required amount of oxidizing gas to the oxidizing gas supplying manifold 42a. The fuel gas supplying means 120, in accordance with an instruction from the controller 150 supplies a required amount of fuel gas to the fuel gas supplying manifold 41a. The voltage-detecting means 130 detects the voltage generated by the fuel cell 200, and communicates the detected voltage to the controller 150. The valve 140, in accordance with an instruction from the controller 150, controls the amount of fuel gas discharged from the fuel cell 200. The controller 150, in accordance with the detected voltage, controls the oxidizing gas supplying means 110, the fuel gas supplying means 120, and the valve 140.

If the valve 140 is closed, the fuel gas flow passage is in a dead-end condition. In this case, it is possible to suppress the unused hydrogen. It is therefore possible to use the hydrogen contained in the fuel gas efficiently to generate electricity. Also, there is no need to discharge hydrogen to the outside. However, when the valve 140 is closed at all times, nitrogen that diffuses from the cathode side may accumulate at the anode side, and water produced by electrical generation might accumulate at the anode side. If this occurs, the electrical generation efficiency of the fuel cell 200 is adversely affected.

Based on the detected voltage, the controller 150, controls the valve 140 to open when the voltage generated by the fuel cell 200 lower than a voltage that corresponds to the amount of oxidizing gas supplied and fuel gas supplied. By doing this, it is possible to discharge nitrogen gas and water produced by electrical generation, which accumulate at the anode side. As a result, it is possible to suppress a decrease in the electrical generation efficiency of the fuel cell 200.

In this embodiment, cut-outs, grooves, or through-holes such as described regarding the first embodiment are provided in the porous-body flow passage 60 of the fuel cell 200. In this case, if the fuel gas flow passage is in the dead-end condition, it is possible to improve the diffusion of fuel gas. By doing this, it is possible to increase the length of time over which electrical generation is possible in the dead-end condition, the result being an improvement in the consumption efficiency of the hydrogen. Also, the efficiency of discharging nitrogen gas and water produced by electrical generation is improved if the valve 140 is in the open condition.

The fuel gas flow passage of the fuel cell 200 may be in the dead-end condition at all times. That is, the valve 140 may be closed at all times, and a member may be provided that blocks the fuel gas discharging manifold 41b in place of the valve 140. This is because, in this case as well, if the cut-outs, grooves, or through-holes are provided in the porous-body flow passage 60, it is possible to improve the diffusion of fuel gas.

The fuel cell 200 may have a dead-end structure, in which the pressure loss of the fuel gas discharged from the fuel gas discharging manifold 41b is higher than the pressure loss of the fuel gas supplied to the fuel gas supplying manifold 41a.

That is, the fuel cell 200 may have a dead-end structure in which the cross-sectional flow area of the discharged fuel gas is made smaller by the valve 140. Also, the fuel cell 200 may have a structure in which the cross-sectional flow area of the discharged fuel gas is smaller than the cross-sectional flow area on the fuel gas supply side.

As described above, the dead-end structure in this embodiment encompasses a structure in which the fuel gas outlet port is always blocked, a structure in which the fuel gas outlet can be selected as either the open or closed condition, and a structure in which the pressure loss at the fuel gas outlet side is larger than the pressure loss at the fuel gas inlet side.

In this embodiment, the valve 140 functions as a flow control member or a pressure loss adjusting section.

While the invention has been described with reference to what are considered to be example embodiments thereof, it is to be understood that the invention is not limited to the described embodiments or constructions. On the contrary, the invention is intended to cover various modifications and equivalent arrangements. In addition, while the various elements of the disclosed invention are shown in various example combinations and configurations, other combinations and configurations, including more, fewer, or only a single element, are also within the scope of the appended claims.

The invention claimed is:

1. A fuel cell comprising:
 a membrane-electrode assembly having an electrical generation section that includes an anode, an electrolyte, and a cathode;
 a porous-body flow passage disposed on at least one of an anode surface and a cathode surface of the membrane-electrode assembly; and
 a separator disposed on the opposite side of the porous-body flow passage from the electrical generation section; wherein
 the porous-body flow passage is made of metal and includes a high porosity region having a higher porosity than an average porosity thereof and a low porosity region having a lower porosity than the average porosity thereof,
 the high porosity region extends in the direction from a gas supply hole formed in the separator to a gas discharge hole formed in the separator to communicate with a gas discharge-side manifold via the low porosity region, and
 the low porosity region extends into the high porosity region of the porous-body flow passage.

2. The fuel cell according to claim 1, wherein the high porosity region is directly connected to a gas supply manifold.

3. The fuel cell according to claim 1, wherein the membrane-electrode assembly has a gas-diffusing layer formed on both surfaces of the electrical generation section.

4. The fuel cell according to claim 1, wherein the porous-body flow passage has a plurality of high porosity regions.

5. The fuel cell according to claim 4, wherein the lengths of each high porosity region is different.

6. The fuel cell according to claim 1, further comprising:
 a flow control member that controls a flow of discharge gas from the anode, wherein the porous-body flow passage is disposed at least at the anode side of the electrical generation section.

7. The fuel cell according to claim 6, wherein:
 the flow control member stops the flow of discharge gas from the anode.

8. The fuel cell according to claim 6, wherein the flow control member is a valve.

9. The fuel cell according to claim 8, further comprising:
 a voltage-detecting unit that detects a voltage of the fuel cell wherein the valve is switched based on a voltage detected by the voltage-detecting unit.

10. The fuel cell according to claim 1, wherein the separator has a plate shape.

* * * * *